May 6, 1952     A. C. HUDSON     2,595,380
PIPE THICKNESS TESTING APPARATUS
Filed Jan. 19, 1948     2 SHEETS—SHEET 1

*INVENTOR.*
ARTHUR C. HUDSON
BY
HIS ATTORNEY

INVENTOR.
ARTHUR C. HUDSON

Patented May 6, 1952

2,595,380

UNITED STATES PATENT OFFICE 2,595,380

PIPE THICKNESS TESTING APPARATUS

Arthur C. Hudson, Ottawa, Ontario, Canada, assignor, by mesne assignments, to Geotechnical Corporation, Dallas, Tex.

Application January 19, 1948, Serial No. 3,086

2 Claims. (Cl. 175—183)

The present invention relates to a method and apparatus for testing the thickness of a wall permeable to magnetic flux with access only to one side of the wall. The present method is more particularly applicable to determining the thickness of iron and steel pipes used in boilers, as for instance boiler tubes without removing the tubes. Such testing is useful for old tubes which have been in place for some time and which may be dangerously corroded both externally and internally. It is advantageous in such methods of testing to be able to make rapid tests, since ordinarily steam or water boilers may have many feet of tubing and tests should be made at many points along the tube to determine its condition. While other methods have been employed for this purpose, the magnetic method appears to provide certain advantages, particularly in its ability to test comparatively thin-walled pipes and thereby discover corroded conditions which would make the pipe dangerous for use.

In accordance with the methods of the present invention, alternating currents of different frequencies providing penetration by magnetic flux to different thicknesses in the wall are used. Higher frequency currents tend to confine the magnetic flux near the external surface of the wall where the magnetic testing unit is applied, and this furnishes a means of surface measurement and of adjustment of balance which holds for a lower frequency flux which has correspondingly greater penetration power, and furnishes thereby a measurement of variation in thickness indicating whether and where corrosion and other effects have taken place.

In the present invention it has been found particularly advantageous to use currents of a 60 cycle frequency range for the higher frequency current and currents of the order of $\frac{6}{10}$ of a cycle in frequency for a lower frequency range. Other comparative frequencies may be used, but one of the features of the present invention is the use of an extremely low frequency to provide a deep penetration into magnetic material of the wall structure. Methods of the present invention are carried out by comparing the wall or pipe under test with a standard element formed of the same magnetic wall material with a surface of non-magnetic material comparable with a rust layer on the external wall or pipe surface under test. Any suitable type of comparing circuit may be used which will accurately indicate comparative changes in the structure under test as the exploring or testing element is changed in position from one place on the pipe to another. A preferable method of indication is obtained by the use of a balancing circuit or network in which the alternating current signal derived from the test element and the standard is opposed and balanced against each other. The unbalance or the amount of adjustment necessary to provide a balance will be an indication of the condition of the unknown wall or pipe under test. In the present invention, the test unit may be continually moved along the surface to be tested, but preferably individual point by point tests are employed and readings are taken for each such test. The test unit itself in the present invention is portable and so also the indicating element which the tester may carry or have near him. The present invention will be more fully described in the specification below when taken in connection with the drawings illustrating an embodiment of the invention in which:

Figure 1:
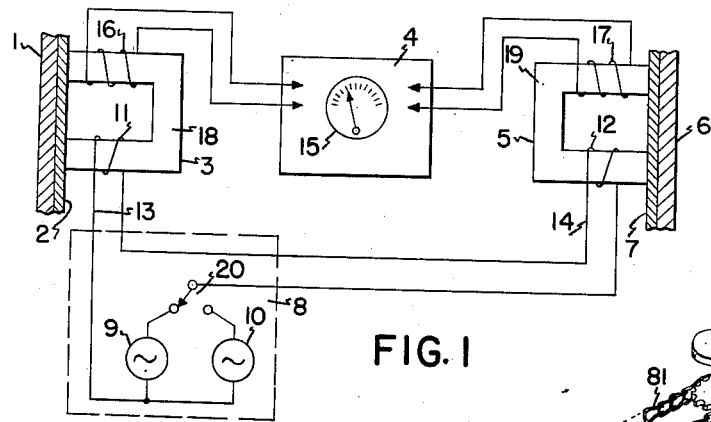
Fig. 1 shows schematically in general outline a system of the present invention.

In the arrangement of Fig. 1, 1 indicates the unknown wall or pipe under test, which is of magnetic material such as steel or iron; 2 indicates a rust scale which may be on the external side of the pipe; 3 indicates the test unit; and 4, the balance indicator or comparator. The balance indicator is also connected to the standard test unit 5, which is applied to a standard wall 6 having a non-magnetic surface layer 7 of a known thickness. A power supply unit 8 which may supply power of a higher frequency 9 or lower frequency 10 to the primary coils 11 and 12 of the test and standard unit respectively is shown in Fig. 1 connected by cables 13 and 14 to the primaries 11 and 12 of the test and standard units respectively.

As indicated in Fig. 1, a standard condition is established by an initial reading of the higher frequency applied to the primary coils 11 and 12, wherein adjustments may be made of the positions of the standard wall, the standard unit, and the non-magnetic coating. The reading on the indicator meter 15 connected to the secondaries 16 and 17 shows the amount of unbalance through the magnetic coupling obtained through the cores 18 and 19 with which the primary and secondary coils of each unit link. This misbalance with a limited surface penetration gives an initial indication of the thickness of the external rust layer and also provides, if no rust layer exists, a means of obtaining a balance between the transformer linkages of both units where the flux does not have its deepest penetration into the walls of the standard and unknown elements. After a setting has been established with the switch 20 connected (as indicated in Fig. 1) to the higher frequency source, the switch arm may be connected to the low frequency output in order to provide a second indication of the difference in balance between the standard and the unit under test.

Figure 4:
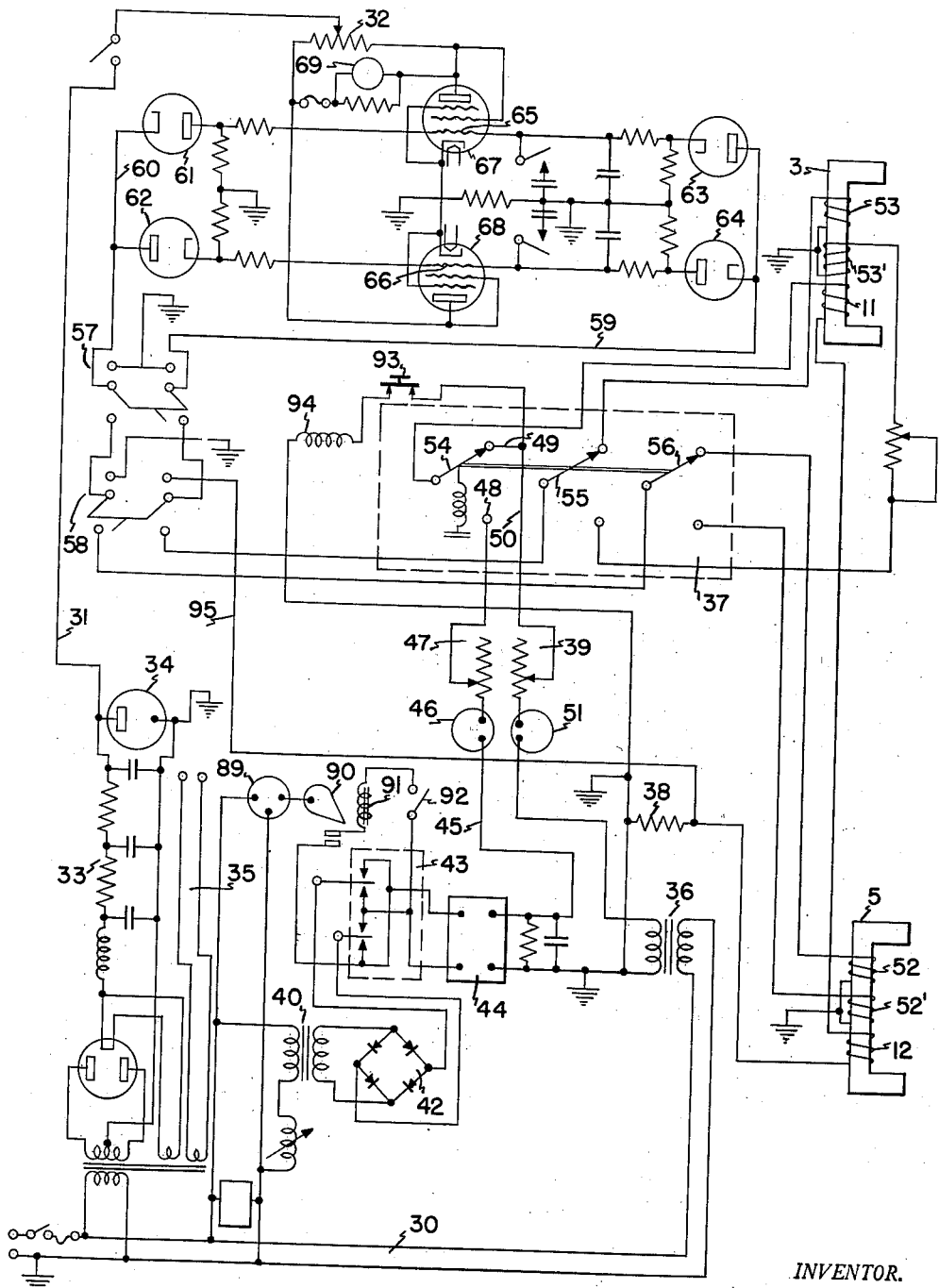
Fig. 4 shows a circuit diagram of the apparatus.

The specific circuit arrangement for the system shown in Fig. 1 is indicated in Fig. 4. The power supply may be derived from the ordinary 60 cycle 115 volts mains indicated at 30. For the indicator unit 4 at the top of the figure, a rectified D. C. source of 115 volts or thereabouts may be supplied over the conductor 31 through the adjustable potentiometer 32. This source of direct current may be obtained from the filtered rectifier 33 whose output is maintained at a constant voltage through the voltage regulator tube 34. The D. C. filament supply may also be obtained from this source over the lines 35. The 60 cycle supply may be taken directly from the mains, but is preferably taken through a transformer 36 across a secondary of which the primary coils 11 and 12 are connected through the relay control switch 37, the function of which will be more fully explained later.

The coils 11 and 12 are connected in series through a low resistance 38 of the order of 0.5 ohm and a potentiometer 39 which is adjusted for initial setting and balance. The lower frequency which in the embodiment indicated in Figure 4 is of the order of 0.6 of a cycle per second is derived from a special generating source also initially supplied across the main supply. For this purpose, the primary of the transformer 40 which supplies the power to energize the low frequency source is connected across the line. The secondary of this transformer is connected to a bridge rectifier 42 which preferably has four arms and is of the variator or dry disk rectifier type. This rectifier has its two terminals transverse to the input connections connected to the poles of the relay operated reversing switch 43. One pair of switch contacts is connected to one line and the other pair, to the opposite line of the switch output through a four terminal wave shape network 44, the output of which on one side is connected to ground, and on the other side, to the conductor 45 through the meter 46, the adjustable potentiometer 47, and the terminal 48 of the control switch 37. The terminal 49 is connected by the line 50 to the potentiometer 39 by means of which the higher frequency current value is controlled, the magnitude of which may be read from the meter 51.

In the circuit arrangement indicated in Fig. 4, the secondary coils are divided into two sections, one section 52 associated with the standard unit and one section 53 with the test unit, both of which are energized by the higher frequency current. The coil 52′ of the standard unit and 53′ of the test unit are associated with the lower frequency current. In the position of the control switch 37 as shown in Fig. 4, the switch arm 54 impresses the higher frequency on both the test coil 11 and the standard coil 12 of the test and standard units 3 and 5 respectively. The switch arm 55 in this same corresponding position is connected to the coil 53 and the switch arm 56 to the corresponding coil 52, both of which are used for the higher frequency currents. With the switch 57 connected downward and the switch 58 also connected downward, the switch elements 55 and 56 are connected through the lines 59 and 60 to opposite ends of the indicator 4 which is of the balance rectifier type.

The balance indicator has impressed on it the voltage received from the reference or standard unit 5 on the left two rectifier tubes 61 and 62, and on the right the voltage received from the test unit is applied to rectifier tubes 63 and 64. A filter network may be employed along with the rectifier as shown, to smooth out the rectified alternating current waves. The balanced rectified output of the filter is impressed in opposed relation, one to the other, upon the grids 65 and 66 of the vacuum tubes 67 and 68 respectively. If a true balance is obtained, the meter 69 will have a given reading dependent upon the constant of the indicator. This, in fact, may be adjusted to zero if desired. The purpose of the tests is to provide a reading with the standard and test units using the high frequency, and then with the same units using the lower frequency, or vice-versa. The differential measurement between the two units will provide an indication of the condition of the pipe, as will be more fully explained below.

Figure 2:
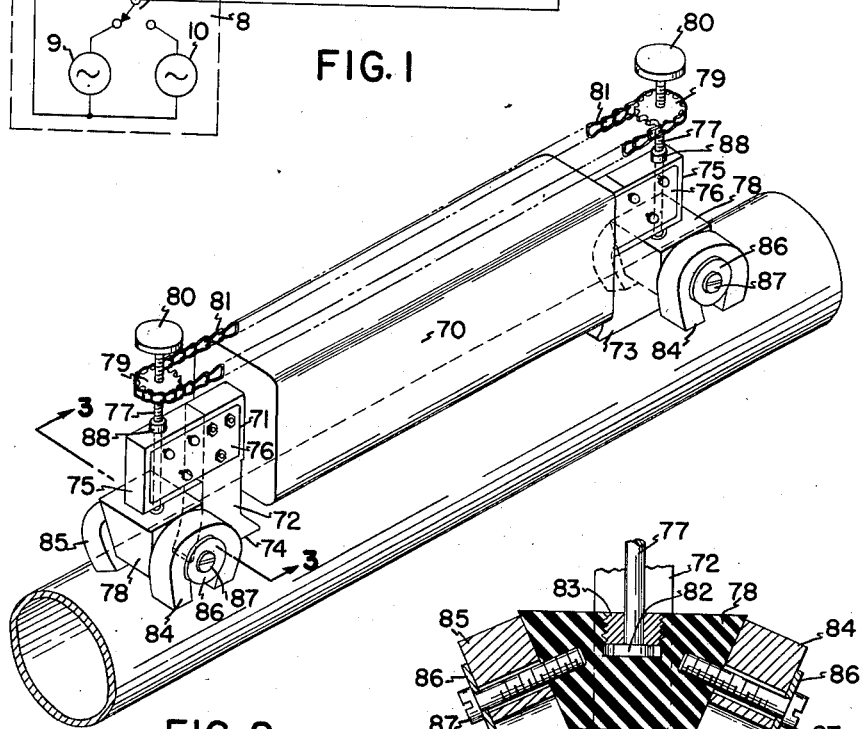
Fig. 2 shows a perspective view of the test unit as applied to a section of a pipe.
Figure 3:
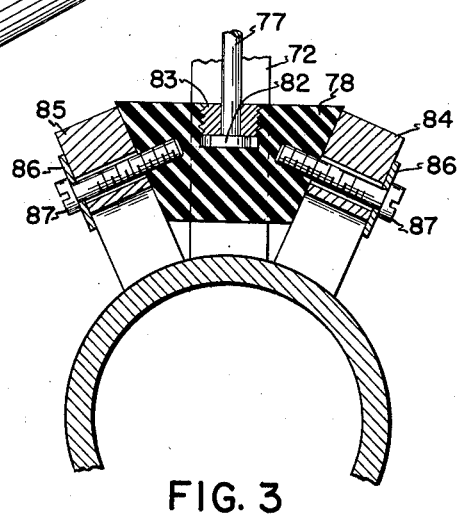
Fig. 3 shows a section taken on the line 3—3 of Fig. 2.

The test and standard units form an important part of the present system. These are shown, as applied to the pipe or wall which is being measured, in Figs. 2 and 3. The unit actually forms with the wall being tested a transformer in which there are both primary and secondary coils (as indicated diagrammatically in Fig. 4), all linking the core 71 to which two pole pieces 72 and 73 are attached at their ends, each of which has shoes 74 which may engage the surface of the wall or pipe or be spaced slightly from it by adjustable elements to be presently described. The core structure may be laminated, if desired, and forms with the pole pieces and the iron and steel pipe a complete magnetic circuit except for air gaps which may exist between the pole shoes and the pipe because of rust or spacing or a combination of both. As indicated in Figs. 2 and 3, there is attached to the core 71 a bracket 75 which may be of non-magnetic material and which may be attached to the core by means of plates 76 bolting the bracket and the core firmly together. The bracket 75 has a screw shaft 77 running through it engaging a part of the wall of the hole or the entire way, if desired.

This shaft 77 extends through the bracket and turns freely in a block 78 of hard rubber or other suitable non-magnetic material. The screw shaft 77 may be provided with a fixed sprocket wheel 79 and a turning knob 80 at its top. The sprocket wheel 79 has meshing with it a sprocket chain 81, which engages at the other end of the unit a similar sprocket wheel similarly mounted. In fact, the rear end of the test unit is the same as the forward end and the numbers therefore are generally repeated. The shaft 77 which engages the block 78 is supported in position in the block for rotation about its axis, but is fixed against longitudinal motion of the shaft as indicated in Fig. 3, which shows a flange 82 at the end of the shaft and a screw threaded plug 83 through which the shaft 77 passes engaging the block 78 and holding the flange in place. The block 78 supports on either side two highly permeable horseshoe magnets 84 and 85, which have sufficient magnetic force to hold the unit in position against a pipe. These magnets, which may be of "Alnico"

or some other such material, are supported by non-magnetic clamping disks 86 and screws or bolts 87 clamping the magnets in proper radial direction against the supporting block 73. The magnets 84 and 85 are at both ends of the units. The unit is attached in the desired place on the pipe or wall, and either of the thumb screws or hooks 80 may be adjusted to provide the proper spacing of the pole shoe from the pipe. Since both screw shafts are synchronized together, the spacings for the air gaps may be maintained equal at all times. When the proper spacing has been obtained, the lock collar 88 may be tightened against the top of the bracket 75 to lock the test unit in its set position. The unit may be placed in a given position and then be moved to another position for test. The reference or standard unit may be constructed exactly like the test unit, but, if desired, the unit may be permanently supported upon the wall or pipe structure by a clamp or strap or some other means, since it is, of course, not necessary to move the standard unit with reference to its standard wall, the only adjustment necessary being the same pole face adjustment which is provided by the bracket and screw shaft arrangement which has been described.

In the theoretical consideration of the system, it will be noted that with the same voltage impressed upon the primary coils of the test and the standard unit, the secondary voltages will be the same if the units are the same, except for the difference in the reluctance of the standard and the unknown wall under test. If, for instance, the wall was entirely broken between the two pole pieces, the reluctance would be extremely high and the secondary induced voltage therefore in the test unit would be far less than that in the standard unit. When a high frequency or relatively high frequency (referring to this particular system in which 60 cycles is considered a comparatively high frequency) is used, the magnetic flux in the wall is sufficiently concentrated near the surface so that both reluctance paths will be approximately the same, providing the unknown rust scale taken of the pipe under test is simulated. Initially, therefore, a standard procedure is to adjust the air gap of the standard unit and that of the unit used in test until a balance is obtained on the indicator 15 or the corresponding meter 69 (Fig. 4). Since the gap of non-magnetic material together with the adjustable spacing of the pole shoes in the standard unit are known, the equivalent thickness of rust scale is thereby determinable. With the test unit set for this valance, therefore, the lower frequency currents may be impressed upon both the test and the standard unit by means of which the flux penetrates through the whole wall structure of both the standard and the unknown pipe. Any internal conditions which will interfere with the reluctance of the material for the longitudinal traverse of magnetic flux, such as pitting, erosion, or corrosion, will produce an unbalance in the indicator system, which will show by a variation of the meter reading from the reading previously taken for the higher frequency currents.

The circuit of Fig. 4 shows various elements for initial adjustments and measurements which may be used. The potentiometer 32 may be used to produce a zero set reading on the meter 69 in the initial adjustment of the indicator. The potentiometer P4 may be used to limit the 60 cycle current through the coil or the high frequency current, while the potentiometer P5 is used in the same way for the lower frequency current. Suitable meters may be connected permanently or temporarily in the circuit, as for instance 51 and 46, to indicate these current values.

In the production of the lower frequency current, the motor 89 is connected across the 60 cycle line to drive the cam 90, which will energize the relay 91 when the switch 92 has been closed. The relay 91 operates the reversing switch 43 previously mentioned for producing a substantially square wave form frequency which the network 44 forms in the desired shape. The relay control switch 37 is operated through the push button 93 which energizes the coil 94 of the relay and rotates the arms 54, 55, and 56 counterclockwise to the top contact positions shown in Fig. 4. When the push button 93 is released, the contact arm drops back to the lower contact positions. For test purposes of the indicator circuit, the switch 57 may be closed to the upper contacts and, similarly, by closing the switch 58 to the upper contacts, primary current may be impressed directly upon the indicator circuit for adjustment purposes over the line 95. The routine of adjustments and test may be carried out in a number of ways, and therefore the description above should be considered by way of example.

While the present system may be used for continuous measurements, in which case a recording meter may be used for the meter 69, better results have been obtained by point for point measurement. A plot of point for point measurement may be obtained providing a curve which will indicate, by its own variation, variations in the characteristics of the pipe along its length. The operator will preferably carry the indicating unit, which is portable, and apply the test unit to the pipe or wall to be tested. In larger power systems, where the boilers may be 40 to 60 feet high, the testing operator will be raised or lowered on a boatswain's chair with the indicator before him, the adjustable elements being provided on the indicator and the test unit in such shape that it may be simply stuck on the pipe. The power supply unit, which may include both the high frequency and lower frequency elements, can be placed in a permanent or semi-permanent position and the indicator test and standard units may form the portable members which the operator carries with him.

Having now described my invention, I claim:

1. A system for determining unknown wall conditions and thicknesses of magnetic materials, comprising a test unit having an open magnetic core with a primary and secondary coil means linked therewith, means forming a magnetic circuit with the wall spanning the open ends of the core, means for impressing for comparative tests a high frequency current of the order of 60 cycles per second and a low frequency current of the order of .6 cycles per second upon said primary, and means measuring the induced voltage of the different currents on the secondary coil means as an indication of the condition and thickness of the magnetic materials.

2. A system for determining unknown wall conditions and thicknesses of magnetic materials, comprising a test unit having an open magnetic core with a primary and secondary coil means linked therewith, means forming a magnetic circuit with the wall spanning the open ends of the core, a standard unit of similar construction having a known wall spanning the open ends of the standard core, means for impressing for comparative tests a high frequency current and then a low frequency current upon said primaries, and means for measuring the induced differential effect upon the test and standard units of both the high and low frequencies as an indication of the condition and thickness of the magnetic material, said high frequency current being in the vicinity of 60 cycles per second and said low frequency being in the vicinity of .6 cycles per second.

ARTHUR C. HUDSON.

REFERENCES CITED

The following references are of record in the file of this patent:

UNITED STATES PATENTS

| Number | Name | Date |
|---|---|---|
| 1,807,411 | Imes | May 26, 1931 |
| 1,823,810 | Wall | Sept. 15, 1931 |
| 2,041,058 | Fossati | May 19, 1936 |
| 2,079,241 | Burt | May 4, 1937 |
| 2,102,452 | Zuschlag | Dec. 14, 1937 |
| 2,116,119 | Loewenstein | May 3, 1938 |
| 2,154,156 | Turner et al. | Apr. 11, 1939 |
| 2,226,275 | Abbott et al. | Dec. 24, 1940 |
| 2,315,943 | De Lanty | Apr. 6, 1943 |
| 2,337,231 | Cloud | Dec. 21, 1943 |
| 2,357,666 | Kuehni | Sept. 5, 1944 |
| 2,495,627 | Bovey | Jan. 24, 1950 |